US010402772B2

United States Patent
Terwilliger et al.

(10) Patent No.: US 10,402,772 B2
(45) Date of Patent: Sep. 3, 2019

(54) CARGO GEOFENCING USING A VEHICLE GATEWAY

(71) Applicant: Dell Products L.P., Round Rock, TX (US)

(72) Inventors: Kevin Terwilliger, Austin, TX (US); Andrew Tosh, Cedar Park, TX (US); Jefferson Walter Wirtz, Round Rock, TX (US); Rex Bryan, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 261 days.

(21) Appl. No.: 15/286,476

(22) Filed: Oct. 5, 2016

(65) Prior Publication Data

US 2018/0096293 A1     Apr. 5, 2018

(51) Int. Cl.
| | |
|---|---|
| *G06Q 10/08* | (2012.01) |
| *H04W 4/021* | (2018.01) |
| *H04W 4/70* | (2018.01) |
| *H04W 4/40* | (2018.01) |
| *H04L 29/08* | (2006.01) |
| *H04L 12/66* | (2006.01) |
| *G07C 5/00* | (2006.01) |

(Continued)

(52) U.S. Cl.
CPC ........ *G06Q 10/0832* (2013.01); *H04W 4/021* (2013.01); *H04W 4/40* (2018.02); *H04W 4/70* (2018.02); *G07C 5/00* (2013.01); *H04L 12/66* (2013.01); *H04L 67/12* (2013.01); *H04W 4/024* (2018.02); *H04W 4/35* (2018.02)

(58) Field of Classification Search
CPC ............... G06Q 10/08; G06Q 10/0834; G06Q 10/0832; H04W 4/70; H04W 4/40; H04W 4/021

USPC .......................................................... 705/332
See application file for complete search history.

(56) References Cited

U.S. PATENT DOCUMENTS

| | | |
|---|---|---|
| 6,154,658 A | 11/2000 | Caci |
| 6,996,469 B2 | 2/2006 | Lau et al. |

(Continued)

FOREIGN PATENT DOCUMENTS

| | | | |
|---|---|---|---|
| WO | WO-2009073674 A1 * | 6/2009 | ............. B60R 25/00 |
| WO | WO-2015134372 A1 | 9/2015 | |

OTHER PUBLICATIONS

ChemSafetyPro. Dangerous Goods Segregation Table and Principles. https://www.chemsafetypro.com/Topics/TDG/Dangerous_goods_segregation_hazardous_chemicals_segregation.html. Published Sep. 9, 2016. (Year: 2016).*

*Primary Examiner* — Brian M Epstein
*Assistant Examiner* — Lisa Ma
(74) *Attorney, Agent, or Firm* — Norton Rose Fulbright US LLP

(57) ABSTRACT

Electronic components may be integrated in objects used by the trucking industry, such as truck, tractor trailer, cargo, and loading bay. These objects may then communicate with each other and with a gateway device to transmit or receive data or commands. The gateway may be configured to attach to the truck, such as by securing to the truck frame or securing to an interior of the truck cab. The gateway may couple to one or more input devices, and receive sensor data through the one or more input devices. The gateway may execute steps that allow the gateway to perform geofencing to prevent conflict between cargo in the vehicle and cargo in another vehicle or in areas of a loading bay.

15 Claims, 8 Drawing Sheets

(51) Int. Cl.
*H04W 4/024* (2018.01)
*H04W 4/35* (2018.01)

(56) References Cited

U.S. PATENT DOCUMENTS

| | | | |
|---|---|---|---|
| 8,075,484 B2 | 12/2011 | Moore-Ede | |
| 8,935,119 B2 | 1/2015 | Yuen | |
| 8,972,175 B2 | 3/2015 | Annapureddy et al. | |
| 9,026,343 B2 | 5/2015 | Mays | |
| 9,679,487 B1* | 6/2017 | Hayward | G08G 1/166 |
| 2011/0130945 A1* | 6/2011 | Deedy | G08G 1/207 |
| | | | 701/112 |
| 2011/0148625 A1* | 6/2011 | Velusamy | G08B 13/1427 |
| | | | 340/539.13 |
| 2013/0293392 A1* | 11/2013 | Hanisch | G08C 17/02 |
| | | | 340/870.07 |
| 2014/0240132 A1 | 8/2014 | Bychkov | |
| 2015/0193729 A1* | 7/2015 | Van Wiemeersch | |
| | | | G06Q 10/087 |
| | | | 701/2 |
| 2015/0325062 A1 | 11/2015 | Mason et al. | |
| 2016/0148440 A1* | 5/2016 | Kwak | G07C 5/008 |
| | | | 701/31.5 |
| 2016/0260059 A1* | 9/2016 | Benjamin | G06Q 10/0832 |
| 2016/0379464 A1* | 12/2016 | Sedayao | G08B 21/0275 |
| | | | 340/686.6 |
| 2017/0185957 A1* | 6/2017 | Kilmer | H04Q 9/00 |
| 2017/0344932 A1* | 11/2017 | Ahmadi | G06Q 10/083 |

* cited by examiner

CARGO GEOFENCING USING A VEHICLE GATEWAY

FIELD OF THE DISCLOSURE

This application is related by subject matter to U.S. patent application Ser. No. 15/286,435 filed on Oct. 5, 2016 and entitled, "Trailer Identification, Inspection, and Verification Using a Vehicle Gateway," to U.S. patent application Ser. No. 15/286,499 filed on Oct. 5, 2016 and entitled, "Trailer Loading using a Vehicle Gateway," to U.S. patent application Ser. No. 15/286,520 filed on Oct. 5, 2016 and entitled, "Truck Safety Zone using a Vehicle Gateway," to U.S. patent application Ser. No. 15/286,526 filed on Oct. 5, 2016 and entitled, "Vehicle Firmware Update using a Vehicle Gateway," and to U.S. patent application Ser. No. 15/286,534 filed on Oct. 5, 2016 and entitled, "Determining a Driver Condition using a Vehicle Gateway."

FIELD OF THE DISCLOSURE

The instant disclosure relates to electronic devices. More specifically, portions of this disclosure relate to integration of electronic devices in the operation of vehicles.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems have garnered ubiquitous use in certain fields, such as financial transactions, data storage, and the like. This is due, in part, to the ability of information handling systems to handle large numbers of tasks with significantly fewer errors than other techniques. Information handling systems can be designed or programmed specifically to perform certain functions, and thus take advantage of further speed advantages from this customization. However, there are certain industries and fields that have historically not modernized to take advantage of the capabilities of information handling systems, or to not fully take advantage of such systems by having specially-designed components. One such industry is the trucking industry. Tractor trailers are responsible for a significant amount of merchandise movement throughout the country and continent, and typically also a part of every merchandise's journey. The population is continuously growing, and also the demand for merchandise. Thus, the trucking industry is also continuously growing. The number of tractor trailers on the road and the number of deliveries by each tractor trailer are continuing to increase. Yet, there has been little modernization of the trucking industry.

However, lack of modernization and implementation of information handling systems has caused many problems with operation of a fleet of tractor trailers. As one example, there is little to no monitoring of truck driver health, such as enforcement of sleep requirements or monitoring of other health issues, which can result in unsafe driving and collisions involving tractor trailers. As another example, fuel efficiency is critical to profit margins of the tractor trailers, and yet there is little or no monitoring of engine operating conditions. As yet another example, the distribution of freight within a tractor trailer can impact operational efficiency and driving stability, and yet there is no optimization of freight arrangements within the tractor trailer. As a further example, the only monitoring of tractor trailers is through GPS devices with limited functionality. Thus drivers often pick up the wrong trailer in a shipping yard, which leads to lost or misdirected merchandise and lost profit.

SUMMARY

Electronic components may be integrated in objects used by the trucking industry, such as truck, trailer, cargo, and loading bay. These objects may then communicate with each other and/or with a gateway device to transmit or receive data or commands. The communications between devices may include relay of information from the objects to a remote server through the Internet. Either the gateway device or the remote server may use the relayed information to verify certain information or provide instruction to vehicle operators to improve efficiency and accuracy of the trucking industry. For example, by verifying trailers assigned to trucks have been picked up by the correct trucks, a reduction in misdirected or lost merchandise is obtained. As another example, by ensuring inspection checklists are completed, costly malfunctions may be avoided and profit margins increased. As a further example, by monitoring the health of the user, the user may feel more secure and happy with their job and thus drivers may be retained longer.

A vehicle gateway, or just "gateway," may be configured to attach to the truck, such as by securing to the truck frame or securing to an interior of the truck cab. The gateway may receive power from the vehicle power system and/or an independent power supply, such as a battery or solar cell. Although vehicle gateways are described as part of a vehicle, the gateways may be used in areas outside of the vehicle such as in loading bays, parking areas, or the like. The gateway may couple to one or more input devices to receive sensor data. The gateway may also be configured, for some of the input devices, to transmit commands to alter operation of certain components onboard or off-board the vehicle. For example, one input device may be a communications radio, such as a Wi-Fi radio, Bluetooth radio, cellular communication radio, or other short-range or long-range communication radio. Through the communications radio the gateway may receive sensor data, for example, from sensors located throughout the trailer or nearby the trailer (e.g., in range of the communications radio). For example, the sensors may be attached to the trailer. In another example, the sensors may be in nearby containers and/or in nearby vehicles. As another example, an input device may be an interface for connecting to an engine computer, such as an OBDII port. The gateway may process raw data received from the electronic components, store the raw or processed data, and/or relay the raw or processed data to a remote server.

The integration of electronic components in the trucking industry makes available new applications for these electronic components and improves operations and efficiency in the trucking industry. For example, beacon devices, or just "beacons," may be integrated with trailers and a vehicle gateway may activate the beacon to determine the trailer identification and verify the correct trailer is being picked up by the vehicle. The beacons may include a memory circuit with stored information and a communications circuit for communicating the stored information to a gateway. As another example, the vehicle gateway may communicate with biometric systems, including mobile devices such as smart watches and mobile phones, to collect information regarding driver behaviors, such as sleep patterns, to assess a condition of the driver. As a further example, electronic sensors may be integrated throughout a tractor trailer and communicate with the vehicle gateway to monitor and/or optimize loading of cargo into the tractor trailer. As yet another example, beacons may be attached to cargo containers and the beacons linked with contents of the cargo such that a vehicle gateway may determine conflicts that may exist between different cargo contents that may create a hazardous condition. As another example, vehicle gateways may communicate with other vehicle gateways to determine and/or optimize formation of vehicle platoons and provide information that ensures safety of nearby vehicles. As a further example, a vehicle gateway may monitor driving conditions and/or a planned truck route to determine when a different engine firmware may provide better fuel efficiency or other benefits and then update the engine firmware with an appropriate firmware.

The vehicle gateway may operate as a data collection device and/or a data processing device. As described throughout, the gateway may receive data from input devices that communicate with beacons, sensors, mobile devices, or other components. This data may be forwarded through, for example, cellular communications systems to cloud-based server that process the data. A driver or other user may then access a dashboard presenting the information and/or alerts based on the information through a web-based interface. Further, the driver or other user may issue commands to the vehicle gateway that are relayed to components in communications with the gateway. The commands may include, for example, remotely updating an engine firmware, changing a vehicle route, establishing new stops on the route, providing messages to a driver, or placing operating restrictions on the vehicle. Cloud-based servers may also automate certain functions by performing monitoring of the received data and sending commands to the gateway when certain conditions are satisfied. Although the gateway may communicate with cloud-based server, the gateway may also independently perform some or all of these functions. For example, a driver or user may access the gateway through a mobile device or nearby computer to access data stored on the gateway. Further, the gateway may process the data and analyze the data to determine if certain conditions are satisfied and take action, such as by transmitting alerts to the driver or another user.

Embodiments of the methods and information handling system may be used to implement geofencing around certain cargo units. For example, information broadcast from beacons associated with the cargo units may inform certain vehicles to keep away, vehicles with certain cargo to keep away, and/or indicate a safe area or distance around the cargo unit for the vehicles to remain away. The information broadcast from the beacons may include substantive information regarding the cargo and/or may include a cargo identifier that may be used to obtain information regarding the cargo from a database. The gateways may also be able to determine when conflicts exist between a vehicle's contents and nearby cargo units to avoid potentially dangerous situations by analyzing a potential danger of chemicals of the first contents coming into proximity with chemicals of the second contents.

Embodiments of an information handling system may include a first gateway configured to operate in a loading area and a second gateway configured to operate with a vehicle. The first gateway may communicate with and manage a first plurality of beacons associated with a plurality of cargo units. The second gateway may also communicate with the first plurality of beacons associated with the plurality of cargo units, such as to receive a cargo identifier. The second gateway may use the cargo identifier to request, from the first gateway, contents of the nearby cargo unit based on the received cargo identifier. The second gateway may then determine whether it is safe for the vehicle to approach the cargo units or the loading bay and/or a safe distance from which to remain from the cargo units or loading bay.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may be adapted to provide services to vehicles, to fleets of vehicles, and/or to drivers of vehicles. Such information handling systems may be particularly useful in the trucking industry, where historically little modernization has occurred. Some hardware and software components for such information handling systems are described in further detail below. One such hardware component is a vehicle gateway that is configured to attached to a vehicle, such as a tractor pulling a trailer. The vehicle gateway may communicate with electronic components in and around the vehicle through wired and wireless communications paths. The gateway may also execute software components for processing the data, triggering alerts, making recommendations, and/or adjusting operation of the vehicle.

Figure 1:
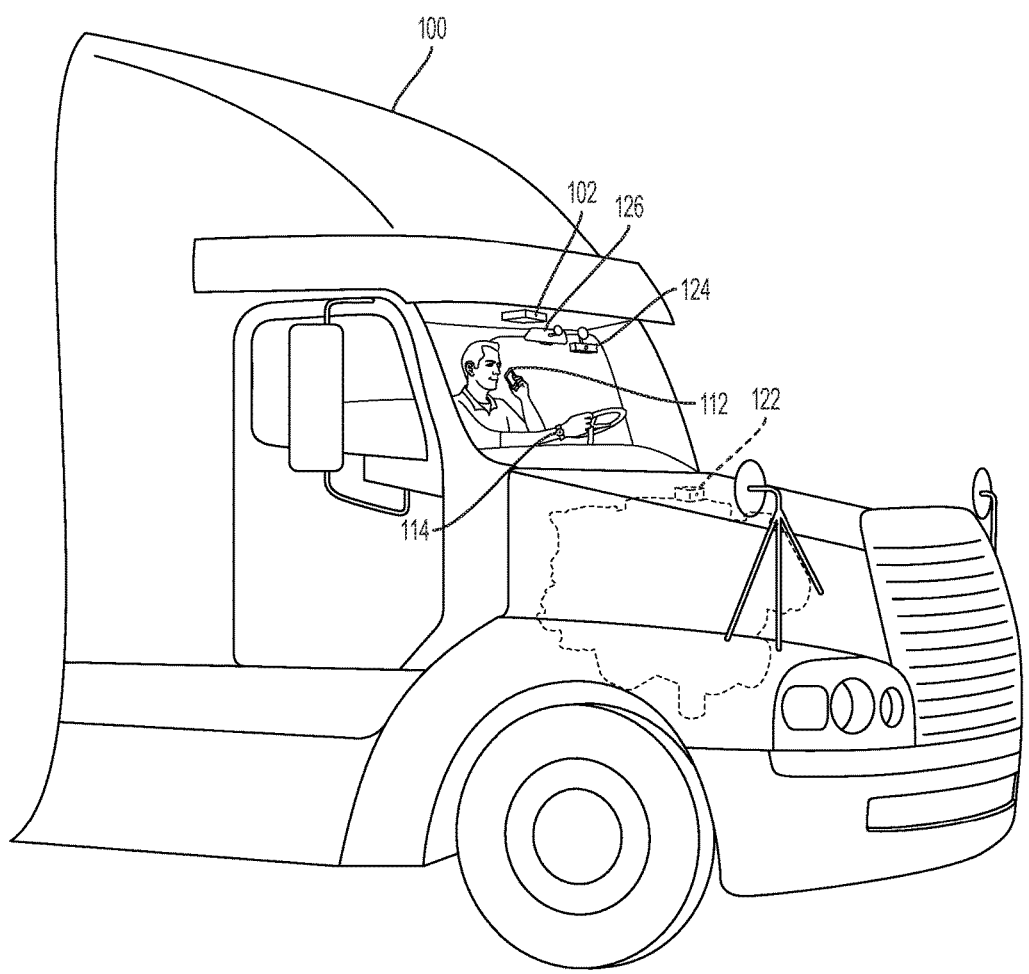
FIG. 1 is a perspective view of a vehicle illustrating an installed gateway for communicating with electronic components in or around the vehicle according to one embodiment of the disclosure.

FIG. 1 is a perspective view of a vehicle illustrating an installed gateway for communicating with electronic components in or around the vehicle according to one embodiment of the disclosure. A vehicle 100 may be a truck with tractor trailer, as shown, or another kind of vehicle, such as a car or sport-utility vehicle (SUV), or another transportation device, such as a cargo boat or aircraft. A gateway 102 may be configured to attach to and attached to the vehicle 100, such as by a screw, bolt, Velcro, adhesive, or other fixing means that affixes the gateway 102 to a component of the vehicle 100, such as a frame or an interior of a cab of the vehicle 100. In some embodiments, the gateway 102 may be a separate component inside the vehicle 100. In some embodiments, the gateway 102 may be integrated with another component attached to the vehicle 100, such as an in-dash display or radio. The gateway 102 may be connected to power or communications systems of the vehicle 100. For example, the gateway 102 may be powered from a 12 Volt direct-current (DC) bus operated by a battery in the vehicle 100. Additionally or alternatively, the gateway 102 may include a back-up or other separated power system to operate the gateway 102 when the vehicle 100 is turned off or when the vehicle 100 malfunctions.

The gateway 102 may communicate with electronic components in and around the vehicle 100 through input devices coupled to the gateway 102. For example, a driver may have a mobile phone 112, a smart watch 114, and/or other electronic devices, such as a tablet computer, a laptop computer, a television, a radio, a GPS device, etc. These mobile devices 112 and 114 may communicate with the gateway 102 through an input device such as, for example, a Bluetooth radio, a Wi-Fi radio, a near field communications (NFC) radio, or other short-range communications radio. As another example, an engine of the vehicle 100 may have an engine computer 122. The gateway 102 may include an input device configured to communicate with the engine computer 122, such as an ODBII port. The gateway 102 may be further coupled to other electronic devices, such as a road-facing camera 124 and/or an eye-tracking system 126, by either wireless or wired connections similar to that described in the examples above. The eye-tracking system 126 may be used to monitor eye movement of a driver, which can provide information regarding, for example, the driver's alertness.

Figure 2:
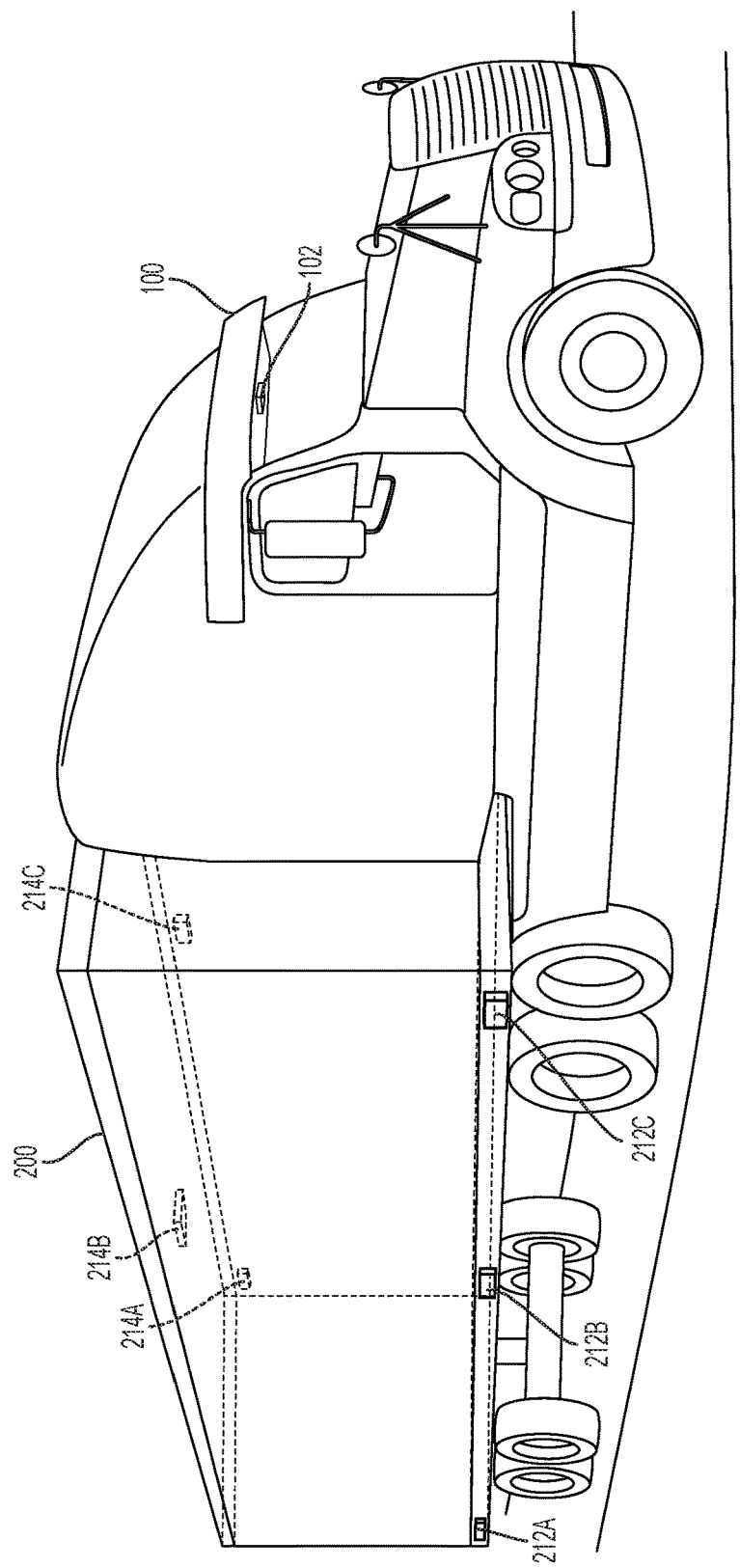
FIG. 2 is a perspective view of a vehicle illustrating an installed gateway for communicating with sensors in and around a tractor trailer attached to the vehicle according to one embodiment of the disclosure.
Figure 3:
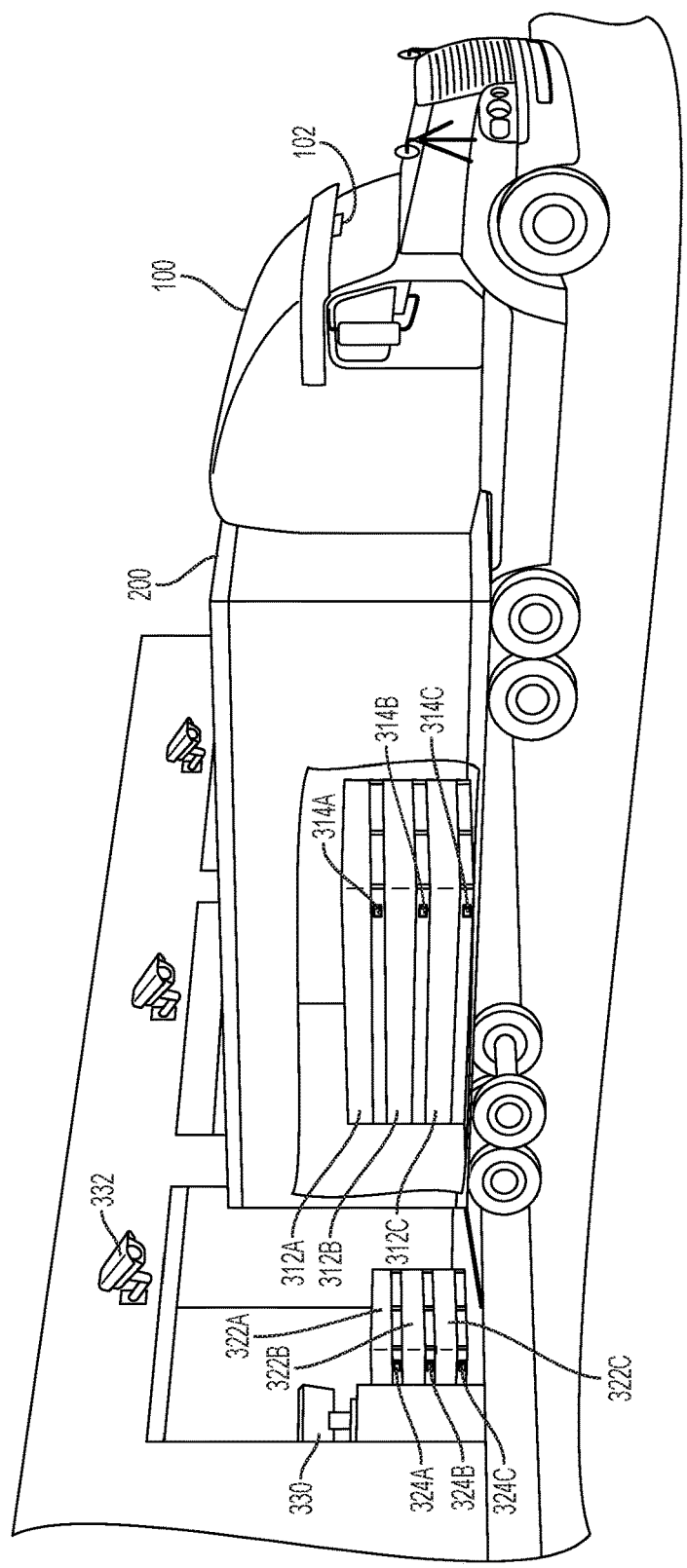
FIG. 3 is a perspective view of a vehicle illustrating an installed gateway for communicating with electronic components in and around the vehicle and in and around a loading bay according to one embodiment of the disclosure.
Figure 4:
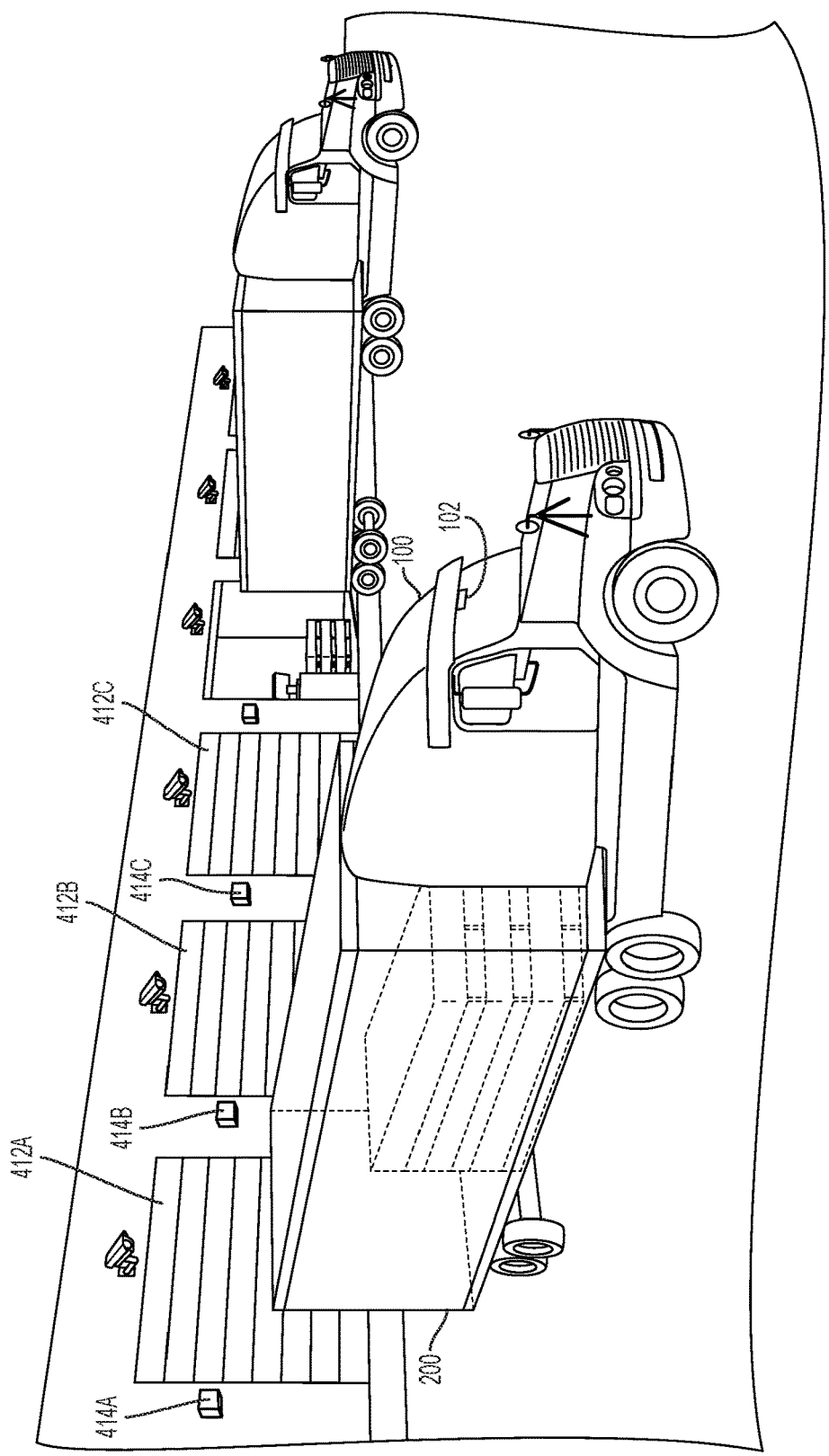
FIG. 4 is a perspective view of a vehicle illustrating an installed gateway for communicating with electronic components in cargo and around a loading bay or other nearby vehicles according to one embodiment of the disclosure.

FIG. 1 shows one configuration of wireless devices that includes user mobile devices 112 and 114, the engine computer 122, the camera 124, and the tracking system 126. However, any combination of electronic devices may be used in combination with the vehicle gateway 102 of embodiments. For example, although FIG. 1 illustrates electronic devices in and around the truck cab, electronic devices may be anywhere in communications range. For example, devices may be in an attached or nearby truck trailer, as shown in FIG. 2, wherein a nearby truck trailer may be a truck trailer within short-range communications range of the vehicle 100. Communications with nearby beacons and gateways may allow, for example, a gateway to identify locations of missing or stolen trailers or cargo when passing within short-range communications range. Further, the vehicle gateway 102 may communicate with stationary gateways and electronic devices, such as beacons, sensors, devices, and gateways in a loading bay as shown in FIG. 3 and FIG. 4. The gateway 102 may also communicate with gateways on other vehicles. For example, a plurality of gateways installed on a plurality of vehicles may communicate with each other to form a mesh network allowing one of the gateways to communicate through other gateways when its long-range communications radio is not functioning correctly.

FIG. 2 is a perspective view of a vehicle illustrating an installed gateway for communicating with sensors in and around a tractor trailer attached to the vehicle according to one embodiment of the disclosure. The gateway 102 may be coupled to or integrated with an input device, such as a low-power RF radio for wireless communications, to communicate with electronic devices 212A, 212B, and 212C attached to a tractor trailer 200. The devices 212A-C may be, for example, sensors (e.g., GPS receivers) or cameras. The devices 212A-C may report loading of the cargo in the trailer or air pressure in tires of the trailer. The same input device may also be used to communicate with electronic devices 214A-C inside the tractor trailer. The devices 214A-C may be beacons attached to cargo that provide information about cargo carried by the tractor trailer or cameras mounted in the interior of the trailer. Example uses of devices attached to the frame and inside the trailer are provided below. The gateway 102 may collect information from the devices 212A-C and 214A-C. The information may be processed by the gateway 102 and used, for example, to assist in arranging cargo in the trailer and in verifying loading of correct cargo in the trailer.

FIG. 3 is a perspective view of a vehicle illustrating an installed gateway for communicating with electronic components in and around the vehicle and in and around a loading bay according to one embodiment of the disclosure. The gateway 102 may communicate with electronic devices outside the vehicle, such as in a loading bay, to facilitate management of cargo in the trailer. For example, cargo pallets 312A, 312B, and 312C inside of the trailer 200 may each have an attached electronic device 314A, 314B, and 314C, respectively, such as a beacon. The beacons 314A-C may transmit cargo identification information that includes an identifier for the attached cargo pallet. The beacon 314A-C may also transmit other information, such as contents of the cargo pallet. In some embodiments, the beacons 314A-C may be active devices that are continuously transmitting data. In other embodiments, the beacons 314A-C may be passive devices that only transmit information when interrogated, similar to RFID tags. Additional cargo pallets 322A, 322B, and 322C may be located inside the loading bay, with attached beacons 324A, 324B, and 324C, respectively. The beacons 324A-C may communicate with the gateway 102 directly. The beacons 324A-C may also communicate with a second gateway 330 inside the loading bay, which may relay information to the gateway 102. Additional electronic devices, inside or outside the trailer 200, may provide further information, such as to verify correct loading of cargo. For example, cameras 332 may capture images or video of the loading of cargo pallets 312A-C and/or 322A-C to provide visual confirmation to verify information from the beacons 322A-C and 324A-C. For example, a gateway 102 may determine if an approximate size of the pallet 312A matches a size of the cargo contents indicated by beacon 322A.

FIG. 4 is a perspective view of a vehicle illustrating an installed gateway for communicating with electronic components in cargo and around a loading bay or other nearby vehicles according to one embodiment of the disclosure. When a vehicle is moving, some electronic devices may enter and exit communications range of the gateway 102. For example, as a tractor trailer drives through a set of loading bays, the gateway 102 may establish communication with each of the electronic devices 414A, 414B, and 414C associated with loading bays 412A, 412B, and 412C, respectively. The gateway 102 may communicate with the electronic devices 414A-C to determine a correct loading bay. The gateway 102 may also communicate with the electronic devices 414A-C to determine if any of the loading bays 412A-C contain cargo that could be potentially hazardous if in close proximity to cargo carried in the trailer. As another example, a vehicle may drive through the loading bays with a gateway 102 to inventory the cargo in the loading bays 412A-C. This would allow for periodic updating of the location of cargo and the ability to find misplaced cargo by driving a vehicle through the loading bay. Alternatively or additionally, the tractor trailers may scan for missing cargo as they drive through the loading bay to pick up or drop-off cargo.

Figure 5:
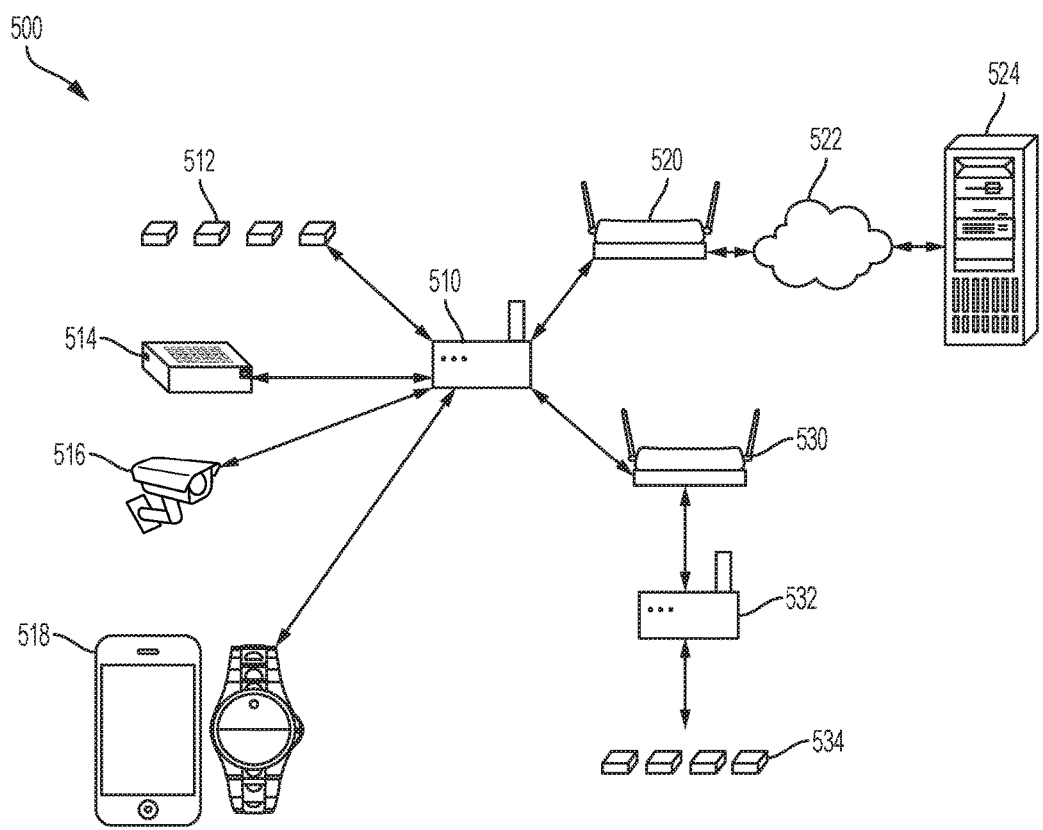
FIG. 5 is a block diagram illustrating communications paths around a vehicle gateway for communicating with electronic components according to one embodiment of the disclosure.

As described in the examples above, many combinations of electronic devices such as shown in FIG. 1, FIG. 2, FIG. 3, and FIG. 4 may be configured to operate with a vehicle gateway. An illustration of communications between the electronic devices is described in FIG. 5 without reference to any particular application. FIG. 5 is a block diagram illustrating communications paths around a vehicle gateway for communicating with electronic components according to one embodiment of the disclosure. A gateway 510 may be coupled to and/or include various input devices to accommodate communication with a variety of devices in different configurations. The gateway 510 may be programmed, such as through firmware or software, to perform a number of different functions involving the various electronic devices. Although certain trucking examples are described in FIG. 1, FIG. 2, FIG. 3, FIG. 4, and the examples below, the gateway 510 may be configured to perform many other functions. For example, rather than using the gateway 510 on a truck for cargo management, the gateway 510 may be installed in a passenger vehicle and used to assist a driver on a cross-country trip. Further, the gateway 510 need not be limited to land vehicles, but may also be used in other configurations, such as on boats and aircraft for tracking cargo.

The gateway 510 may be coupled to and/or include input devices for communicating with local electronic devices that are in or near the vehicle. For example, the gateway 510 may be configured with wireless or wired communication input devices to receive data from vehicle sensors 512, an engine computer 514, cameras 516, and/or mobile devices 518. The input devices configured to communicate with the devices 512, 514, 516, and/or 518 may include wired communications interfaces, such as Ethernet, OBDII, serial, or parallel interfaces, and/or wireless communications interfaces, such as Wi-Fi, Bluetooth, ZigBee, RFID, or NFC.

The gateway 510 may also be coupled to input devices, such as modem devices, for communicating with electronic devices away from the vehicle. For example, the gateway 510 may be coupled to a long-range communications modem 520 for communicating over a network 522, such as the Internet, with remote servers 524. The remote servers 524 may offer storage and/or processing capabilities that enhance the function of the gateway 510. As another example, the gateway 510 may be coupled to and/or include a short-range communications modem 530 for communicating with a second gateway 532. The second gateway 532 may be attached to a second vehicle and be configured to communicate with electronic devices 534 in or near the second vehicle. The gateway 510 may have access to raw data from the electronic devices 534 and/or receive processed data from the second gateway 532.

The vehicle gateway may be used to monitor cargo contents and cargo locations to prevent conflicts between cargo. The conflicts may be any kind of interference, incompatibility, or safety hazard that results from combination of the cargo contents or an increased risk of interference, incompatibility, or safety hazard that results from a close distance between certain cargo units. For example, some cargo contents should never come in contact with each other, such as when contact would destroy some of the cargo or when contact would create a safety hazard for the local community. For example, food stuffs should not be allowed in close proximity with or in contact with poisonous chemicals. As another example, quarantined animals may be located in some cargo units that should not be approached to avoid spread of disease.

In some embodiments, information regarding the vehicle may also be used to determine if a conflict exists. For example, a diesel truck may emit vibrations that are unsuitable around unstable explosives stored in certain cargo units. However, electric and gasoline engines may be allowed around the cargo units. As another example, combustion engines may emit exhaust that damages cargo or that could react with cargo. However, electric engines may be allowed around the cargo units. The vehicle gateway may thus use information other than just the cargo contents in determining whether a conflict exists.

To assist the vehicle gateway in tracking cargo and contents, cargo pallets may include beacons that broadcast information regarding the cargo pallet and its contents. The broadcasted information may include substantive information regarding the contents of the cargo units (e.g., chemicals or other contents thereof or a list of certain vehicles and/or cargo that should not be near the cargo units) and/or identifying information that may be used to look up the cargo in a database. Alternatively, the beacons may allow interrogation to obtain the information. One configuration of components for tracking cargo is shown in FIG. 6.

Figure 6:
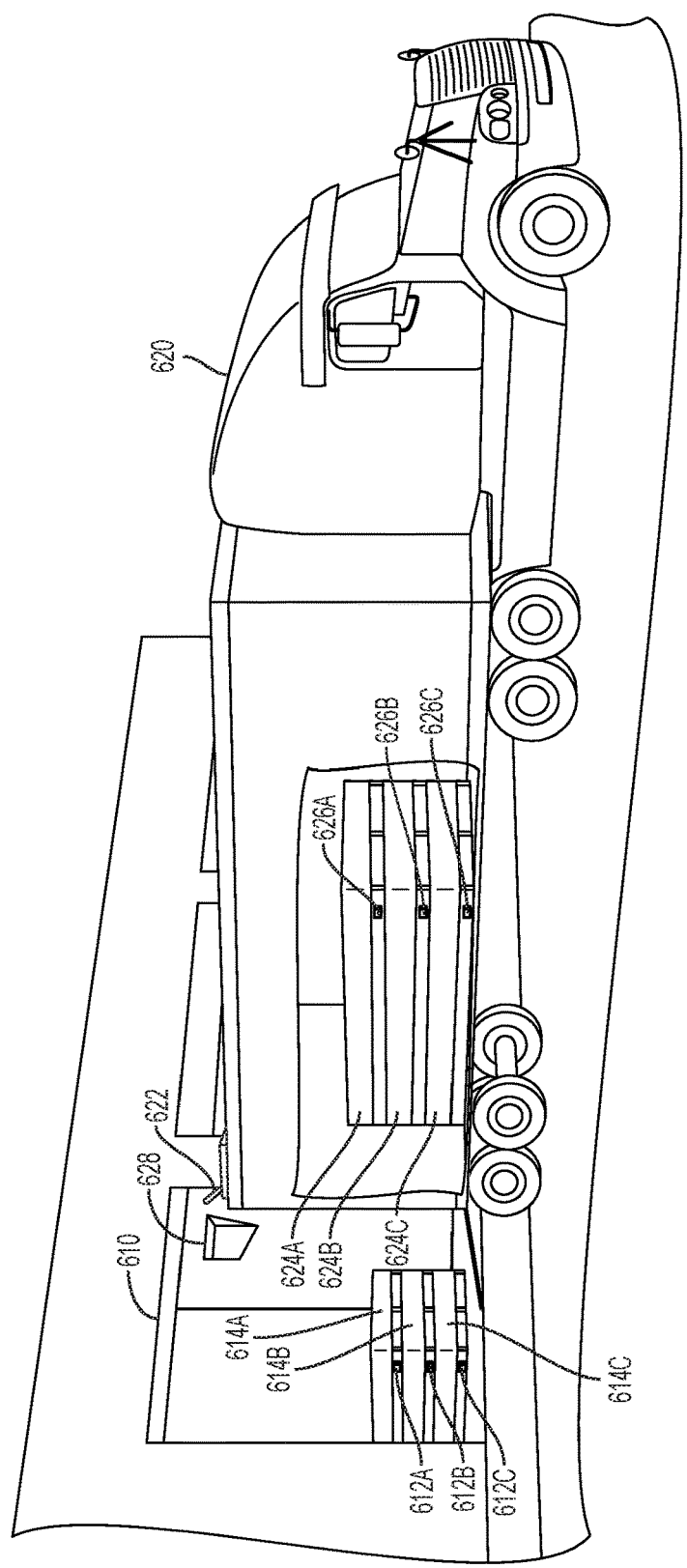
FIG. 6 is a perspective view of a loading bay with cargo pallets tagged with beacons according to one embodiment of the disclosure.

FIG. 6 is a perspective view of a loading bay with cargo pallets tagged with beacons according to one embodiment of the disclosure. A truck 620 may have a tractor trailer with cargo pallets 624A, 624B, and 624C. Each of these cargo pallets may include beacons 626A, 626B, and 626C, respectively. An input device, such as a communications radio, may be coupled to or included in a vehicle gateway 622 attached to the truck 620. The communications radio may communicate with the beacons 626A-C under control of the gateway 622. Through the communications radio, the gateway 622 may track cargo pallets 624A-C stored within the tractor trailer. The gateway 622 may track identification numbers for the cargo pallets 624A-C and/or contents of the cargo pallets 624A-C associated with the beacons 626A-C. Additional cargo pallets 614A, 614B, and 614C may be stored in a loading bay 610 at which the truck 620 is parked or passing by. The cargo pallets 614A-C may be associated with beacons 612A-C. The loading bay 610 may have a gateway 628 with a communications radio for tracking cargo pallets 614A-C within the loading bay 610 through communications with the beacons 612A-C. Further, the vehicle gateway 622 may receive "do not approach" transmissions from either the loading bay gateway 628 or the beacons 612A-C in the loading bay 610. Still further, the vehicle gateway 622 may receive a cargo identifier from the beacons 612A-C and use the cargo identifier to query the loading bay gateway 628 with the identifier to obtain a listing of contents of the respective cargo pallets 614A-C. These warning signals may be broadcast to indicate that certain vehicles or all vehicles should not approach the loading bay 610 or cargo pallets 614A-C and may be accompanied by a distance around the pallets 614A-C that should not be breached. The vehicle gateway 628 may use location information from a GPS unit to determine whether the safe distance is breached or plan a route that avoids breaching the safe distance.

The gateway 622 of the vehicle 600 may be programmed with software or firmware to perform steps that facilitate geofencing around cargo pallets or gateways. Geofencing refers to the act of blocking off a certain geographical area from entry by certain things. In a loading bay, geofencing may be the act of instructing certain vehicles to not approach a certain geographical area. The instruction may be based on a conflict, such as known sensitivities around cargo within the geofenced geographical area. The instruction may also or alternatively be based on a conflict, such as known interactions between cargo in the geofenced area and specific cargo in an approaching vehicle. One example method for implementing geofencing is described with reference to FIG. 7.

Figure 7:
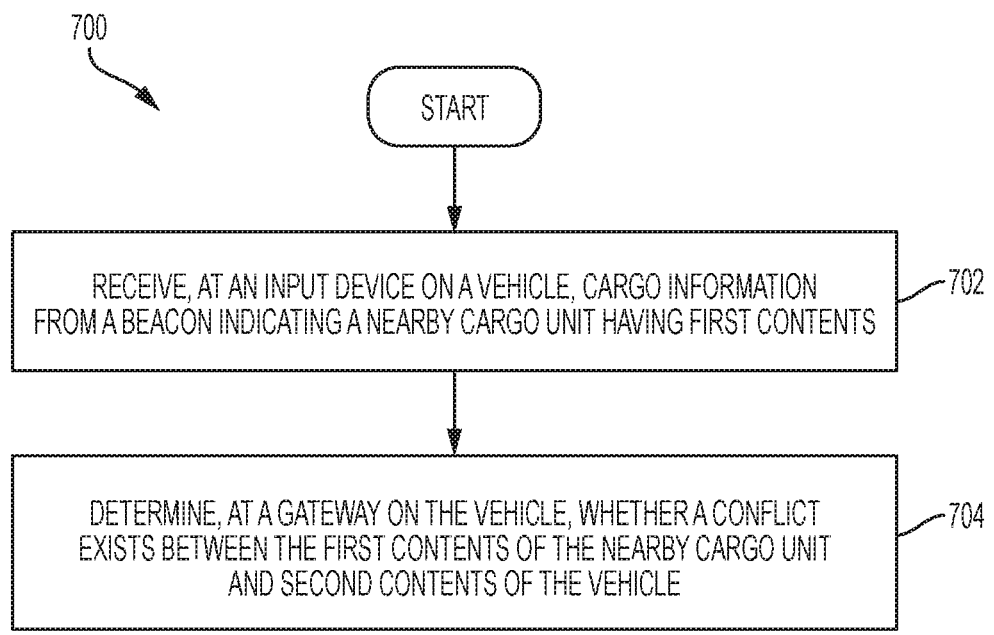
FIG. 7 is a flow chart illustrating a method of determining conflicts between cargo according to one embodiment of the disclosure.

FIG. 7 is a flow chart illustrating a method of determining conflicts between cargo according to one embodiment of the disclosure. A method 700 may begin at block 702 with receiving, at an input device on a vehicle operating with a vehicle gateway, cargo information from a beacon indicating a nearby cargo unit (e.g., cargo pallet) includes certain contents, referred to as first contents. The gateway may receive identification of the specific contents of the cargo unit, identification of types of contents of the cargo unit, identification of types of materials that conflict with the contents of the cargo unit, or an identifier for the cargo unit that may be used to ascertain the contents. Then, at block 704, the gateway may determine whether a conflict exists between those contents of the cargo unit and contents within the vehicle, referred to as second contents.

If a conflict exists, the gateway may take action to notify a user of the conflict. Alternatively or additionally if a conflict exists, the gateway may reroute the vehicle and/or inhibit or prohibit operation of the vehicle that would cause the vehicle to come within a geofenced area around the cargo unit. As part of the rerouting, the vehicle gateway may project the route of the vehicle to a future time and determine whether a conflict exists between the first contents and the second contents at any future time. That is, when a conflict exists, the vehicle gateway may determine an area around the nearby cargo unit in which the vehicle should not enter to prevent the conflict. As part of inhibiting or prohibiting operation of the vehicle, the vehicle gateway may transmit a control signal to the vehicle computer.

Figure 8:
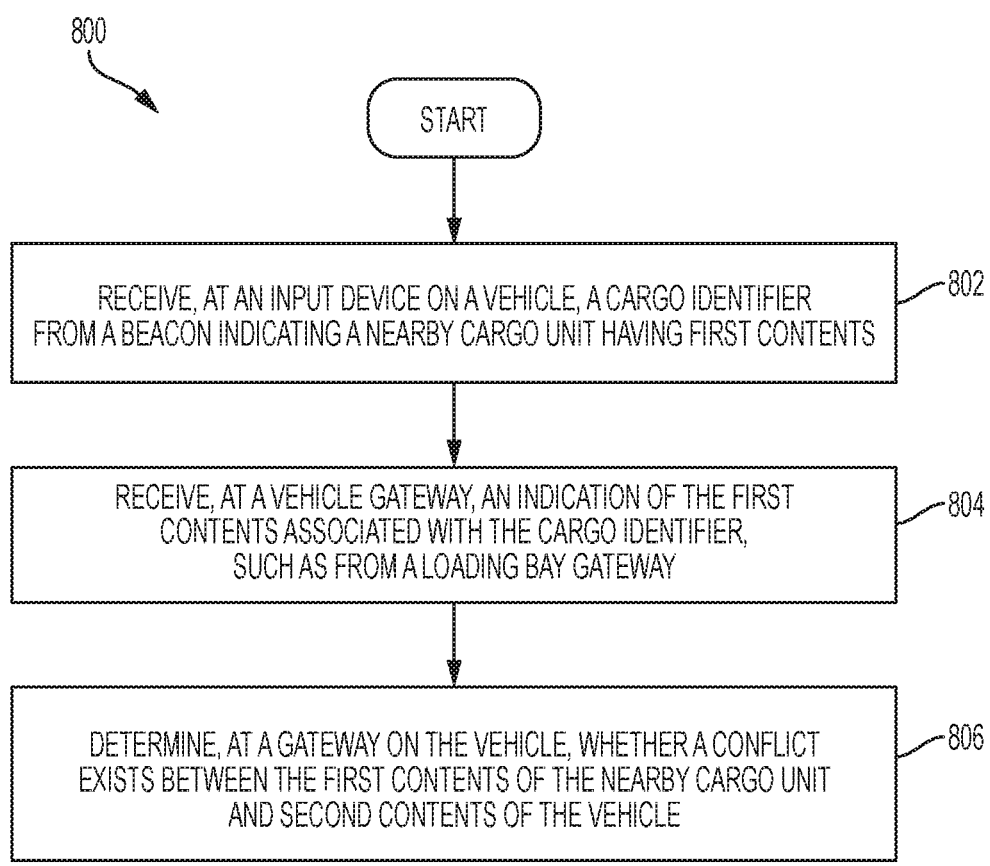
FIG. 8 is a flow chart illustrating a method of determining conflicts between cargo according to another embodiment of the disclosure.

When a beacon does not broadcast information specifying the contents or conflicting contents for a cargo unit, the identification value transmitted by the beacon may be used to look-up a list of contents or a list of conflicting contents for the cargo unit. The identification value may include a special subset to provide an initial indication that the cargo may be subject to geofencing. Further, there may be multiple subsets for different categories of geofencing. These special subsets may provide necessary information to the vehicle gateway without the gateway unnecessarily querying the loading bay gateway for cargo not subject to geofencing. In one embodiment, the look-up may be performed by the vehicle gateway by requesting the additional information from a loading bay gateway (or other gateway in the loading area). FIG. 8 is a flow chart illustrating a method of determining conflicts between cargo according to another embodiment of the disclosure. A method 800 may begin at block 802 with the vehicle gateway receiving, through an input device on the vehicle, a cargo identifier from a beacon identifying a nearby cargo unit, which has first contents. Then, at block 804, the vehicle gateway may receive an indication of the first contents associated with the cargo identifier. For example, the vehicle gateway may communicate with a loading bay gateway to send the cargo identifier and receive a listing of the first contents. Next, at block 806, the vehicle gateway may determine whether a conflict exists between the first contents of the cargo unit and second contents of the vehicle.

The schematic flow chart diagrams of FIGS. 7 and 8 are generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The operations described above as performed by a gateway, beacon, or electronic device may be performed by any circuit configured to perform the described operations. Such a circuit may be an integrated circuit (IC) constructed on a semiconductor substrate and include logic circuitry, such as transistors configured as logic gates, and memory circuitry, such as transistors and capacitors configured as dynamic random access memory (DRAM), electronically programmable read-only memory (EPROM), or other memory devices. The logic circuitry may be configured through hard-wire connections or through programming by instructions contained in firmware. Further, the logic circuitry may be configured as a general purpose processor capable of executing instructions contained in software. If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although processors are described as components in gateways, beacons, mobile devices, or electronic devices, aspects of the invention may be implemented on different kinds of processors, such as graphics processing units (GPUs), central processing units (CPUs), and digital signal processors (DSPs). As another example, although processing of certain kinds of data may be described in example embodiments, other kinds or types of data may be processed through the methods and devices described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. An information handling system, comprising:
   at least one input device configured to wirelessly communicate with a beacon;
   a gateway configured to attach to a vehicle and to communicate with the at least one input device, wherein the gateway is configured to perform steps comprising:
   receiving cargo information from the beacon, the cargo information describing first contents of a nearby cargo unit;
   determining whether a conflict exists with the first contents of the nearby cargo unit and second contents associated with the vehicle;
   based on a determination that a conflict exists with the first contents of the nearby cargo unit and second contents associated with the vehicle, determining an area around the nearby cargo unit which the vehicle should not enter; and
   transmitting a control signal to the vehicle to at least prevent the vehicle from entering the determined area.

2. The information handling system of claim 1, wherein the step of determining whether a conflict exists further comprises determining whether a conflict exists between the first contents of the nearby cargo unit and the vehicle.

3. The information handling system of claim 1, wherein the gateway is further configured to perform steps comprising notifying a user when a conflict exists between the first contents and the second contents.

4. The information handling system of claim 1, wherein the gateway is further configured to prevent the vehicle from entering the determined area by adjusting a route of the vehicle to avoid the determined area to prevent the conflict.

5. The information handling system of claim 1, wherein the step of receiving cargo information from the beacon further comprises receiving a cargo unit identifier, and wherein the first contents associated with the nearby cargo unit is obtained by accessing a network database with the cargo unit identifier.

6. The information handling system of claim 1, wherein the gateway is integrated with the at least one input device.

7. A method, comprising: receiving, by a gateway configured to attach to a vehicle, cargo information from a beacon, the cargo information describing first contents of a nearby cargo unit; determining, by the vehicle gateway, whether a conflict exists with the first contents of the nearby cargo unit and second contents associated with the vehicle; based on a determination that a conflict exists with the first contents of the nearby cargo unit and second contents associated with the vehicle, determining, by the vehicle gateway, an area around the nearby cargo unit which the vehicle should not enter; and transmitting, by the vehicle gateway, a control signal to the vehicle to at least prevent the vehicle from entering the determined area.

8. The method of claim 7, wherein the step of determining whether a conflict exists further comprises determining whether a conflict exists between the first contents of the nearby cargo unit and the vehicle.

9. The method of claim 7, further comprising notifying a user when a conflict exists between the first contents and second contents associated with the vehicle.

10. The method of claim 7, wherein the control signal is transmitted to inhibit operation of the vehicle by adjusting a route of the vehicle to avoid the determined area to prevent the conflict.

11. The method of claim 7, wherein receiving cargo information further comprises receiving a cargo unit identifier, and the method further comprising accessing a network database with the cargo unit identifier to obtain the first contents associated with the nearby cargo unit.

12. An information handling system, comprising:
a first plurality of beacons associated with a plurality of cargo units in a loading bay;
a first gateway configured to communicate with the first plurality of beacons;
a second gateway configured to attach to a vehicle and to communicate with the first plurality of beacons, wherein the second gateway is configured to perform steps comprising:
receiving a cargo identifier associated with at least one of the first plurality of beacons;
receiving, from the first gateway, cargo information for cargo contents associated with the cargo identifier;
determining whether a conflict exists with the cargo contents;
based on a determination that a conflict exists with the cargo contents associated with the cargo identifier, determining an area around a cargo unit of the plurality of cargo units corresponding to the at least one of the first plurality of beacons associated with the cargo identifier which the vehicle should not enter; and
transmitting a control signal to the vehicle to at least prevent the vehicle from entering the determined area.

13. The information handling system of claim 12, wherein the second gateway is further configured to prevent the vehicle from entering the determined area by adjusting a route of the vehicle to avoid the determined area to prevent the conflict.

14. The information handling system of claim 12, wherein the second gateway is further configured to perform steps comprising:
communicating with a second plurality of beacons associated with vehicle contents to obtain vehicle cargo information; and
determining chemicals of the vehicle contents by communicating with the at least one of the second plurality of beacons,
wherein the step of determining whether a conflict exists comprises comparing the cargo information from the first plurality of beacons with the vehicle cargo information from the second plurality of beacons.

15. The information handling system of claim 14, wherein the second gateway is further configured to perform steps comprising notifying a user when a conflict exists between the cargo contents and the vehicle contents.

* * * * *